United States Patent
Kondo

(10) Patent No.: US 8,416,521 B2
(45) Date of Patent: Apr. 9, 2013

(54) MAGNETIC RECORDING AND REPRODUCTION DEVICE AND FLYING HEIGHT CONTROL METHOD

(75) Inventor: Masayuki Kondo, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 81 days.

(21) Appl. No.: 13/102,954

(22) Filed: May 6, 2011

(65) Prior Publication Data

US 2012/0002319 A1  Jan. 5, 2012

(30) Foreign Application Priority Data

Jun. 30, 2010 (JP) .................................. 2010-150222

(51) Int. Cl.
  *G11B 21/02* (2006.01)
  *G11B 27/36* (2006.01)
  *G11B 5/09* (2006.01)
(52) U.S. Cl. .................. 360/75; 360/31; 360/53
(58) Field of Classification Search .................. None
  See application file for complete search history.

(56) References Cited

U.S. PATENT DOCUMENTS

| 2007/0268609 A1* | 11/2007 | Kakiki | 360/75 |
| 2009/0225461 A1 | 9/2009 | Aoki | |
| 2011/0211275 A1* | 9/2011 | Antoku et al. | 360/75 |

FOREIGN PATENT DOCUMENTS

| JP | 61-005655 | 2/1986 |
| JP | 09-044979 | 2/1997 |
| JP | 11-339414 | 12/1999 |
| JP | 2008-226370 | 9/2008 |
| JP | 2009-217868 | 9/2009 |

OTHER PUBLICATIONS

Notice of Rejection mailed by the Japan Patent Office on Aug. 23, 2011 in corresponding Japanese patent app. No. 2010-150222 in 5 pages.

* cited by examiner

*Primary Examiner* — Andrew L Sniezek

(74) *Attorney, Agent, or Firm* — Knobbe Martens Olson & Bear LLP

(57) ABSTRACT

According to one embodiment, a magnetic recording and reproduction device includes a head; a heater configured to heat the head by electric power supplied; a detector provided with a resistive element and configured to detect a contact between the head and a magnetic recording medium by detecting a change in resistance of the resistive element associated with the contact between the head and the magnetic recording medium; and a flying height controller configured to control a flying height of the head from the magnetic recording medium by supplying electric power to the heater to thermally deform the head and to bring the deformed head into contact with the magnetic recording medium so as to determine reference power supplied when the head is in contact with the magnetic recording medium and by supplying electric power to the heater based on the reference power.

8 Claims, 13 Drawing Sheets

FIG.6
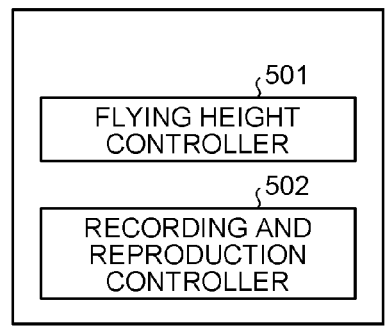
FIG.7
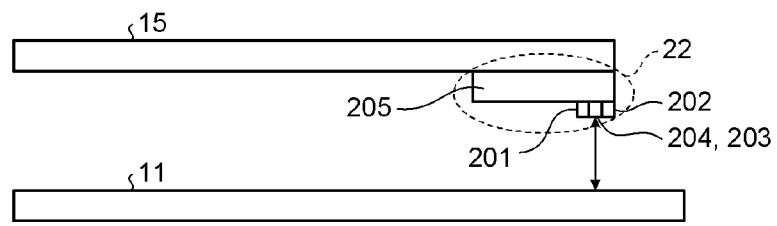
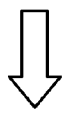
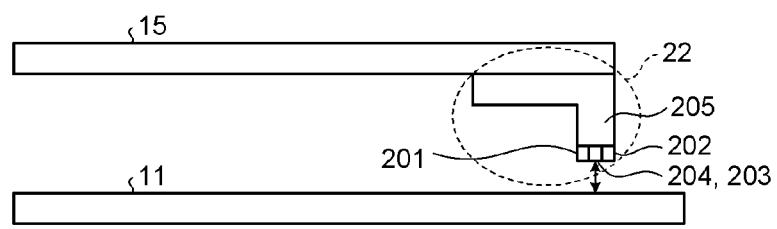

FIG.16

| RETRY COUNT 1 | 0 | 1 | 2 | 3 |
|---|---|---|---|---|
| TOUCHDOWN DETECTION FLAG | 0 | 1 | 1 | 0 |
| POWER CHANGE FLAG | 0 | 0 | 1 | 1 |
| REFERENCE POWER P | Ptn | Ptn-Pr(1) | Ptn-Pr(1)-Pr(2) | Ptn-Pr(1)-Pr(2)+Pr(3) |
| REPRODUCTION RESULT | REPRODUCTION ERROR | REPRODUCTION ERROR | REPRODUCTION ERROR | REPRODUCTION SUCCESS |

MAGNETIC RECORDING AND REPRODUCTION DEVICE AND FLYING HEIGHT CONTROL METHOD

CROSS-REFERENCE TO RELATED APPLICATIONS

This application is based upon and claims the benefit of priority from Japanese Patent Application No. 2010-150222, filed Jun. 30, 2010, the entire contents of which are incorporated herein by reference.

FIELD

Embodiments described herein relate generally to a magnetic recording and reproduction device and a flying height control method.

BACKGROUND

In a hard disk drive (HDD) having a magnetic disk, a magnetic head records on and reproduces the magnetic disk keeping a space from the magnetic disk, in other words, flying over the magnetic disk. However, due to temperature, humidity, or altitude of the environment in which the HDD is used or a partial protrusion and the like on the magnetic disk, flying height control may not be carried out properly resulting in a touchdown where the head comes in contact with the magnetic disk.

When such a touchdown occurs, a recording error or a reproduction error may occur caused by high flying of the head, deterioration of head positioning accuracy, high-temperature demagnetization due to heat generated by the contact, or other phenomena associated with the touchdown. Therefore, the flying height of the head with respect to the magnetic disk requires a highly precise designing in the manufacturing process of the HDD so that the touchdown is prevented from occurring under the environment of the HDD usage of the user.

Meanwhile, in recent years, the capacity of magnetic disks has been becoming larger due to high density recording. To realize the recording in high density on the magnetic disk, it is necessary to reduce the flying height of the head from the magnetic disk to the minimum level. Accordingly, with a larger capacity of the magnetic disk, the possibility of an unintended touchdown occurring due to changes in external environment and the like is increasing.

When a touchdown occurs under the environment of the HOD usage of the user, a special process of recording or reproduction needs to be performed again (retry process). In conventional art, however, it is difficult to detect a touchdown and to perform the retry process of recording or reproduction when the touchdown occurs under the environment of the HDD usage of the user.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 6 is an example schematic block diagram of a software structure realized by executing a magnetic disk control program by a CPU of the magnetic disk device in the embodiment;

FIG. 7 is an example schematic diagram for explaining DFH control in the embodiment;

FIG. 16 is an example diagram for explaining one example of changes of the reference power in the embodiment;

DETAILED DESCRIPTION

In general, according to one embodiment, a magnetic recording and reproduction device, comprises a magnetic recording medium, a head, a heater, a detector, and a flying height controller The head is configured to record on the magnetic recording medium and reproduce the magnetic recording medium. The heater is configured to heat the head by electric power supplied. The detector is provided with a resistive element and is configured to detect a contact between the head and the magnetic recording medium by detecting a change in resistance of the resistive element associated with the contact between the head and the magnetic recording medium. The flying height controller is configured to control a flying height of the head from the magnetic recording medium by supplying electric power to the heater to thermally deform the head and to bring the deformed head into contact with the magnetic recording medium so as to determine reference power that is electric power supplied when the head is in contact with the magnetic recording medium and by supplying electric power to the heater based on the reference power.

An embodiment of a magnetic disk device applied with a magnetic recording and reproduction device and a flying height control method will be described in detail based on accompanying drawings below.

Figure 1:
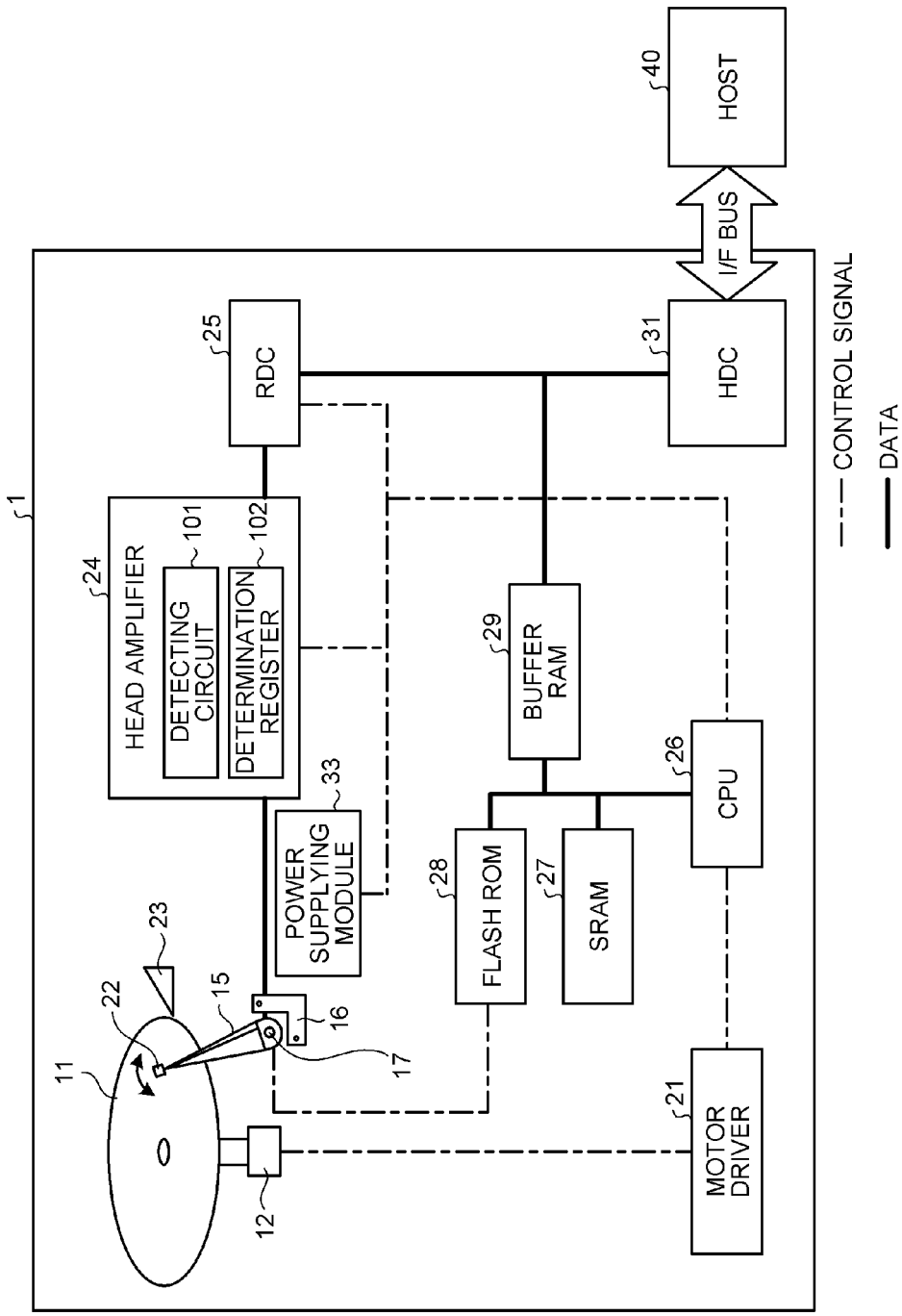
FIG. 1 is an example schematic block diagram of a magnetic disk device according to an embodiment.

FIG. 1 is a schematic block diagram of a magnetic disk device according to the embodiment. The magnetic disk device 1 of the embodiment comprises, similarly to a known hard disk drive, as a schematic structure, inside a housing (not illustrated), a magnetic disk 11, a spindle motor 12 that rotates the magnetic disk 11, a magnetic head 22, an actuator arm 15, a voice coil motor (VCM) 16, a ramp 23, and the like.

The magnetic disk 11 is rotated by the spindle motor 12. The actuator arm 15 is rotatably mounted on a pivot 17. On one end of the actuator arm 15, the magnetic head 22 is mounted. To the other end of the actuator arm 15, the voice coil motor (VCM) 16 is connected The voice coil motor (VCM) 16 rotates the actuator arm 15 about the pivot 17 and positions the magnetic head 22 at a given radius position in a state flying over the magnetic disk 11.

The magnetic disk device 1 according to the embodiment comprises, as an electrical hardware structure, as illustrated in FIG. 1, a motor driver 21, a head amplifier 24, a read write channel (RDC) 25, a hard disk controller (HDC) 31, a central processing unit (CPU) 26, a static random access memory (SRAM) 27 as a work memory, a flash read-only memory (ROM) 28 of a non-volatile memory, and a buffer RAM 29 for temporary storage.

The motor driver 21, by a command from the CPU 26, drives the spindle motor 12 rotating the magnetic disk 11 about a rotating shaft at a specified rotational speed. Furthermore, the motor driver 21, by a command from the CPU 26, drives the voice coil motor (VCM) 16 moving the magnetic head 22 on the end of the actuator arm 15 in the radius direction of the magnetic disk 11.

The magnetic head 22 writes data on the magnetic disk 11 and reads data recorded on the magnetic disk 11.

Figure 2:
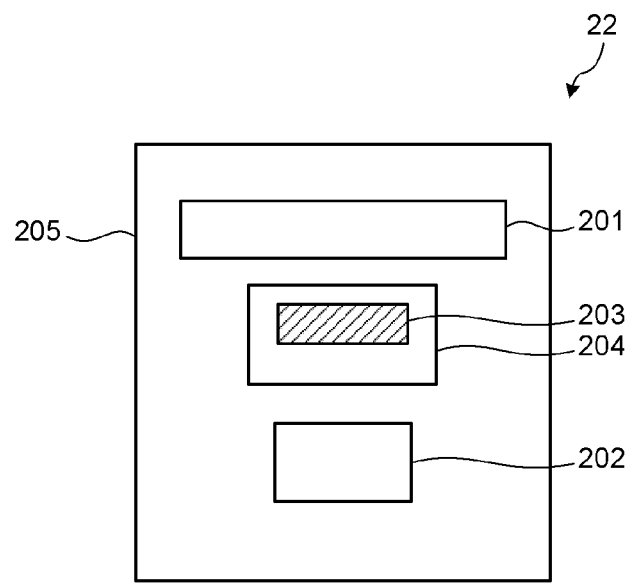
FIG. 2 is an example schematic diagram of a magnetic head viewed from a recording surface side of a magnetic disk in the embodiment.
Figure 3:
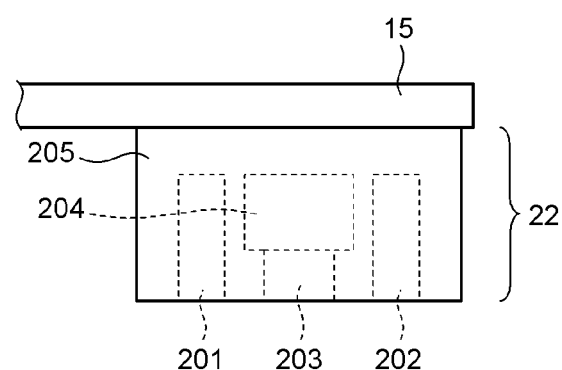
FIG. 3 is an example schematic diagram of the magnetic head viewed from a circumferential edge of the magnetic disk in the embodiment.

FIGS. 2 and 3 are schematic diagrams of the magnetic head 22. FIG. 2 illustrates the structure of the magnetic head 22 viewed from the recording surface side of the magnetic disk 11, and FIG. 3 illustrates the structure of the magnetic head 22 viewed from a circumferential edge side of the magnetic disk 11.

As illustrated in. FIGS. 2 and 3, in the magnetic head 22 of the embodiment, a recording head 201, a reproduction head 202, a heater 204 as a heating module, and a head-disk interface (HDI) sensor 203 as a detector are provided on a head slider 205.

The recording head 201 writes data to data areas of the magnetic disk 11 by magnetic field generated from the magnetic pole of the recording head 201. The reproduction head 202 detects the change in magnetic field on the magnetic disk 11 as data to read the data recorded on the magnetic disk 11. When the rotation of the magnetic disk 11 is stopped and the like, the magnetic head 22 is retracted on the ramp 23 (see FIG. 1).

The HDI sensor 203 is provided with a resistive element (not illustrated in FIGS. 2 and 3) and detects, by using the resistive element, the contact of the recording head 201 or the reproduction head 202 with the magnetic disk 11. The detail of detection by the HDI sensor 203 will be described later.

The heater 204 heats up the head slider 205 of the magnetic head 22 by electric power supplied from a power supplying module 33. By the heating, the head slider 205 is thermally deformed, whereby a flying height of the magnetic head 22 from the magnetic disk 11 is changed.

Referring back to FIG. 1, the power supplying module 33 supplies power to the heater 204 by a command from the CPU 26. The detail of control of the flying height of the magnetic head 22 by heating the heater 204 will be described later.

The head amplifier 24 amplifies a signal of reproduction waveform read from the magnetic disk 11 by the reproduction head 202 to output to the RDC 25. Furthermore, the head amplifier 24 amplifies a writing signal received from the RDC 25 to output to the recording head 201.

The head amplifier 24, other than having such an amplifying function, further comprises a detecting circuit 101 as a detector and a determination register 102 as illustrated in FIG. 1. The detecting circuit 101 detects a change in resistance of the resistive element in the HDI sensor 203. In the determination register 102 a flag indicative of detection of a contact of the magnetic head 22 with the magnetic disk 11 detected by the head amplifier 24 is set when the detecting circuit 101 detects a change in resistance. The head amplifier 24 also has a constant current source built-in (not illustrated) supplying power to the resistive element 401 (See FIG. 4) of the HDI sensor 203.

Figure 4:
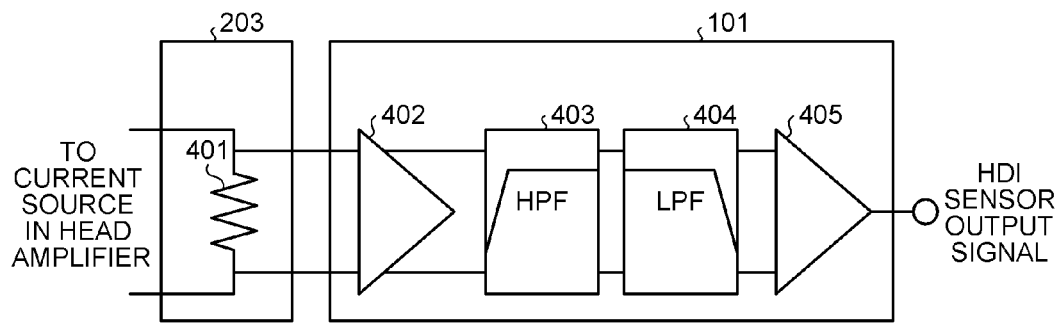
FIG. 4 is an example schematic circuit diagram of an HDI sensor and a detecting circuit in the embodiment.

The detail of detecting a contact of the recording head 201 or the reproduction head 202 with the magnetic disk 11 by the HDI sensor 203 and the detecting circuit 101 in the head amplifier 24 will now be explained. FIG. 4 is a schematic circuit diagram of the HDI sensor 203 and the detecting circuit 101. In the HDI sensor 203, as illustrated in FIG. 4, the resistive element 401 is built-in. The resistive element 401 is connected to the constant current source in the head amplifier 24.

The recording head 201 records on and the reproduction head 202 reproduces the magnetic disk 11 flying over the magnetic disk 11 with a space of a few nanometers therebetween. However, due to temperature, humidity, or altitude of the usage environment of the magnetic disk device 1 or a partial protrusion and the like on the magnetic disk 11, the flying height control may not be carried out properly resulting in a contact (collision) of the recording head 201 or the reproduction head 202 with the magnetic disk 11. When the recording head 201 or the reproduction head 202 comes in contact with the magnetic disk 11, the HDI sensor 203 is thermally changed as a consequence of friction heat caused by the contact. Accordingly, the resistance of the resistive element 401 of the HDI sensor 203 changes. The detecting circuit 101 detects the change in the resistance to detect the touchdown of the magnetic head 22. Therefore, for the resistive element 401, an element having a high thermal change rate is preferably used.

Hereinafter, the contact (collision) of the recording head 201 or the reproduction head 202 with the magnetic disk 11 is referred to as "touchdown".

The detecting circuit 101 comprises an amplifier 402 connected to the resistive element 401, a high pass filter (HPF) 403 connected to the amplifier 402, a low pass filter (LPF) 404 connected to the HPF 403, and an amplifier 405 connected to the LPF 404. Because the resistive element 401 is connected to the constant current source in the head amplifier 24, when the resistance of the resistive element 401 changes, the change of the resistance appears as a change in voltage output across the terminals of the resistive element 401. Accordingly, the detecting circuit 101 detects the change in voltage to detect the change in resistance of the resistive element 401. More specifically, the voltage at the resistive element 401 is amplified by the amplifier 402, and its low frequency component is removed by the HPF 403, and its high frequency component is removed by the LPF 404, and then it is amplified by the amplifier 405 to be output from the amplifier 405 as an HDI sensor output signal.

Figure 5:
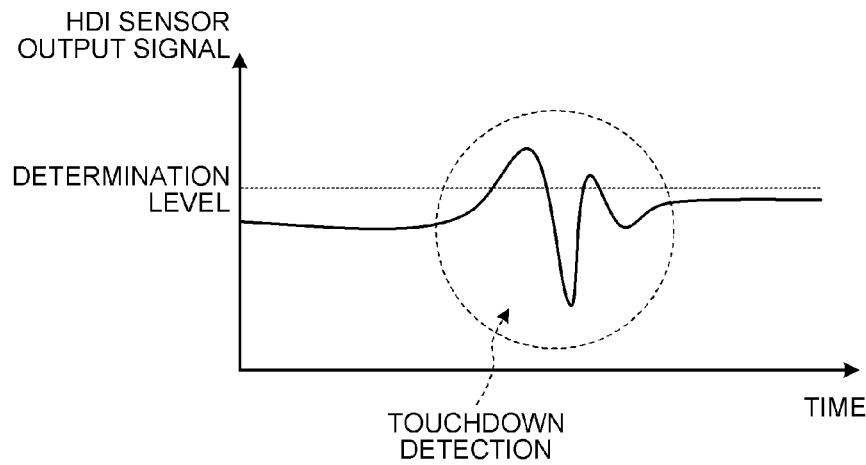
FIG. 5 is an example graph illustrating an output characteristic of an HDI sensor output signal of the HDI sensor in the embodiment.

FIG. 5 is a graph illustrating an output characteristic of the HDI sensor output signal of the HDI sensor 203. In FIG. 5, the horizontal axis represents the time, and the vertical axis represents the HDI sensor output signal. The head amplifier 24 of the embodiment sets a determination level that is a predetermined threshold value for touchdown determination in an internal memory. When the HDI sensor output signal output from the detecting circuit 101 exceeds the determination level, the head amplifier 24 sets the flag indicative of the detection of a touchdown in the determination register 102. This allows the CPU 26 (a later described flying height controller 501) to determine the occurrence of the touchdown by checking the flag in the determination register 102.

Additionally, by providing a counter in the head amplifier 24 and counting the number of times the HDI sensor output signal exceeds the determination level by using the counter, the head amplifier 24 may be configured to measure the number of touchdowns.

Referring back to FIG. 1, the RDC 25 performs code demodulation on a signal output from the head amplifier 24 to output to the HDC 31 as digital data. The RDC 25 also performs code modulation on write data received from the HDC 31 to output to the head amplifier 24.

The HDC 31 carries out control of sending and receiving data between the HDC 31 and a host computer (host) 40 via an I/F bus, control of the buffer RAM 29, error correction process of data for recorded data, and the like. The buffer RAM 29 is used as a cache for the data sent to and received from the host computer 40. The buffer RAM 29 is also used to temporarily store the data read from the magnetic disk 11, the data written to the magnetic disk 11, or a control firmware read from the magnetic disk 11.

The CPU 26 carries out overall control of the magnetic disk device 1 according to a magnetic disk control program stored in the flash ROM 28 in advance.

FIG. 6 is a block diagram of a software structure realized by executing the magnetic disk control program by the CPU 26 of the magnetic disk device 1. As illustrated in FIG. 6, the CPU 26 of the magnetic disk device 1 realizes a block structure with a flying height controller 501 and a recording and reproduction controller 502 by running the magnetic disk control program stored in the flash ROM 28.

The flying height controller 501 controls the flying height of the magnetic head 22 from the magnetic disk 11. In the present embodiment, dynamic fly height (DFH) control is used as flying height control.

FIG. 7 is a schematic diagram for explaining the DFH control. In the embodiment, as described above, the heater 204 is mounted between the recording head 201 and the reproduction head 202 of the magnetic head 22. The flying height controller 501 sends out a power supplying command to the power supplying module 33, and the power supplying module 33, upon receiving the command, supplies electric power to the heater 204 to heat up the heater 204. By the heating, the head slider 205 of the magnetic head 22 is thermally deformed, as illustrated in the upper half to the lower half of FIG. 7, whereby the flying height of the recording head 201 and the reproduction head 202 from the magnetic disk 11 is changed.

Figure 8:
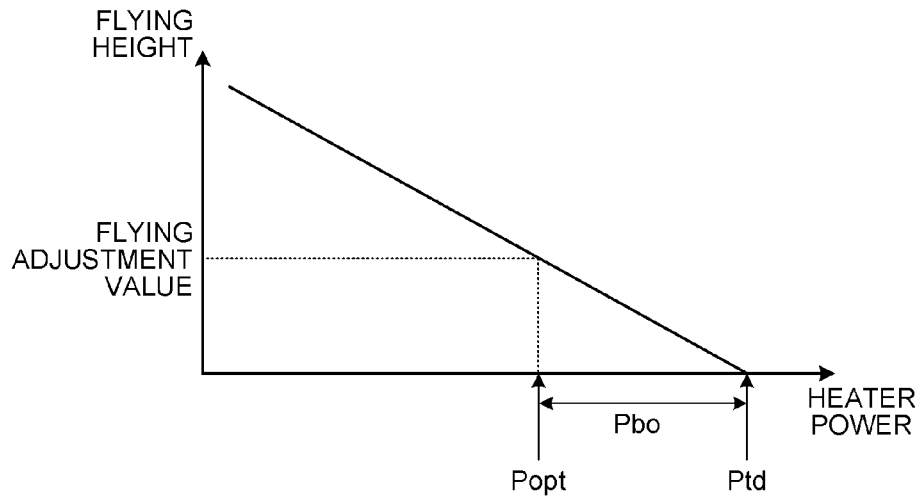
FIG. 8 is an example graph illustrating the relation between electric power for a heater and a flying height of the magnetic head when the DFH control is performed.

FIG. 8 is a graph illustrating the relation between the power supplied to the heater 204 and the flying height of the magnetic head 22 when the DFH control is performed. In FIG. 8, the horizontal axis represents the electric power supplied to the heater 204 (heater power), and the vertical axis represents the flying height of the magnetic head 22. As illustrated in FIG. 8, because the thermal deformation of the magnetic head 22 changes depending on the amount of power supplied to heat the heater 204, the flying height controller 501 controls the amount of power supplied from the power supplying module 33 to the heater 204 to control the flying height of the magnetic head 22.

In other words, when the DFH control is not used, the flying height varies depending on an individual magnetic head. In the flying height controller 501 of the embodiment, by using the DFH control, a command to supply the power to the heater 204 is sent out to the power supplying module 33 so as to make the magnetic head 22 contact (touchdown) the magnetic disk 11 intentionally. Accordingly, a reference power that is the amount of power supplied when the touchdown occurs (when the magnetic head 22 is in contact with the magnetic disk 11) is determined. The flying height controller 501 then sends out a command to the power supplying module 33 to supply, as the amount of power corresponding to the flying height as a target, the amount of power (Popt) that is the result of subtracting the amount of power for adjustment (Pbo) from the reference power (Ptd) to the heater 204 so as to control the flying height of the magnetic head 22.

The flying height controller 501 also changes the reference power when a reproduction error occurs while reproducing the magnetic disk 11 or when a recording error occurs while recording on the magnetic disk 11, or when a reproduction error occurs while verifying the recorded data and when the flag indicative of the occurrence of a touchdown is set in the determination register 102 of the head amplifier 24 (when the touchdown of the magnetic head 22 is detected). The flying height controller 501 then sends out the command to the power supplying module 33 to supply the power (Popt) that is the result of subtracting the power for adjustment (Pbo) from the changed reference power to the heater 204, thereby controlling the flying height of the magnetic head 22.

The flying height controller 501 changes the reference power by reducing the reference power when the flag indicative of the occurrence of a touchdown is set in the determination register 102. In contrast, when the flag indicative of the occurrence of a touchdown is not set in the determination register 102 (when the touchdown of the magnetic head 22 is not detected) and when the reference power is reduced already, the flying height controller 501 changes the reference power by increasing the reference power.

Figure 18:
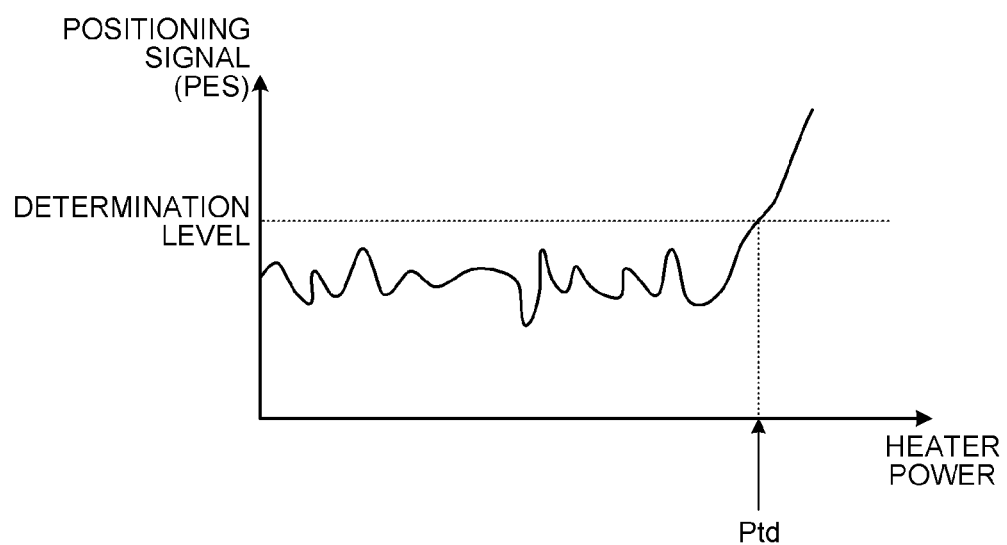
FIG. 18 is an example graph illustrating the relation between a positioning signal and heater power in a first touchdown determination approach in conventional art.

As an approach to determine a touchdown of the magnetic head in conventional art, two approaches are known. The first approach is to determine a touchdown of the magnetic head based on a change in a positioning signal. FIG. 18 is a graph illustrating the relation between the positioning signal and the heater power in the first touchdown determination approach in conventional art. In FIG. 18, the horizontal axis represents the power supplied to the heater (heater power), and the vertical axis represents the output of the positioning signal (PES). In this approach, as illustrated in FIG. 18, the positioning signal (PES) of the head generated at the time of touchdown of the magnetic head is monitored. When the deterioration in positioning accuracy exceeds a given determination level, the amount of power supplied to the heater is determined as the reference power (Ptd) at touchdown.

In the first approach in conventional art, when the positioning accuracy is poor due to external vibration, servo quality, and mechanical characteristics of the device without a touchdown of the magnetic head occurring, it may be hard to detect a change in the positioning accuracy at touchdown and thus, the reference power for the heater at touchdown may become too large. Furthermore, when unexpected external vibration occurs while measuring the reference power, the power supplied to the heater not causing a touchdown may be determined as a touchdown and thus, the reference power for the heater at touchdown may become too small Furthermore, near the center circumference of the magnetic disk, the deterioration of the positioning accuracy at touchdown is hard to detect and therefore, measuring the reference power for the heater at touchdown is difficult.

Meanwhile, in the embodiment, by carrying out the DFH control using the HDI sensor 203, the reference power for the heater at touchdown can be accurately measured without being affected by the positioning accuracy of the magnetic head 22. A touchdown occurring near the inner circumference of the magnetic disk 11 can also be detected and thus, the reference power can be measured.

Figure 19:
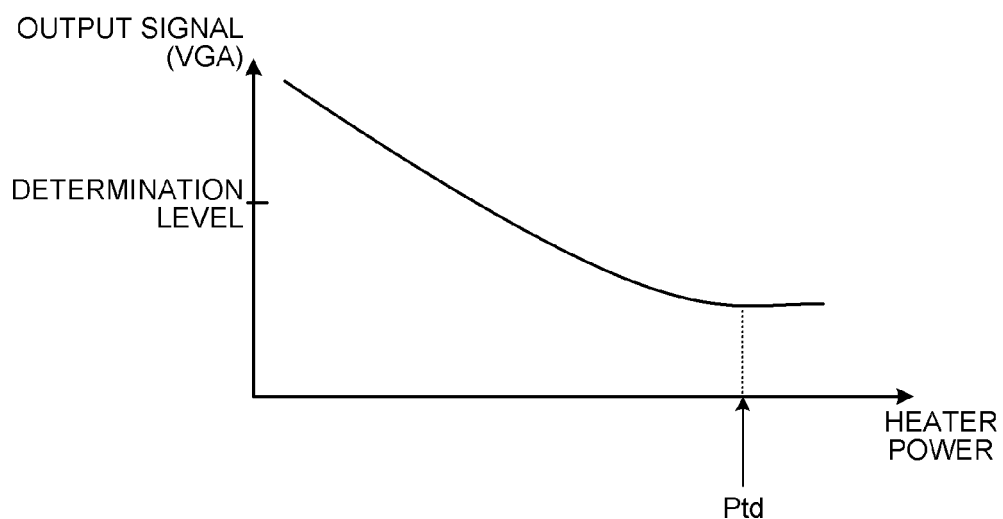
FIG. 19 is an example graph illustrating the relation between an output signal of a magnetic head and heater power in a second touchdown determination approach in conventional art.

The second approach is to determine a touchdown of the magnetic head by a saturating condition in level of an output signal of the magnetic head. FIG. 19 is a graph illustrating the relation between the output signal of the magnetic head and the heater power in the second approach to determine a touchdown in conventional art. In FIG. 19, the horizontal axis represents the power supplied to the heater (heater power), and the vertical axis represents the output signal of the magnetic head. In this approach, by monitoring the level of the output signal of the magnetic head, the condition in which the level of the output signal is saturated with respect to the power supplied to the heater is determined as a touchdown.

In the second approach, a change in the output with respect to the flying of the magnetic head depends on the recording density of the recorded data. Accordingly, when a servo output is used, the sensitivity of touchdown detection deteriorates at the outer circumference of the magnetic disk and thus, the reference power for the heater at touchdown may become too large.

In contrast, in the embodiment, by carrying out the DFH control using the HDI sensor 203, the touchdown detection can be carried out regardless of the recording density of the magnetic disk 11 because it is not necessary to reproduce data on the magnetic disk 11 for the detection of a touchdown.

In the first and the second approaches in conventional art, for the sole purpose of detecting a touchdown of the magnetic head, monitoring the deterioration of positioning accuracy and monitoring the output signal of the magnetic head, respectively, are required. This requires a special operation not practicable in an environment where the magnetic disk device is used by the user.

Furthermore, when determination a touchdown of the magnetic head, because a touchdown condition and a non-touchdown condition need to be compared for detection, it is difficult to determine the touchdown of the magnetic head by the measurement only at the touchdown. Accordingly, the detection of a touchdown in the first and the second approaches is feasible when adjusting the heater power in the adjustment process before shipping the magnetic disk device. However, under the situation where the magnetic disk device is used by the user after shipment, constantly monitoring contacts of the magnetic head with the magnetic disk is operationally difficult.

Accordingly, in the embodiment, by carrying out the DFH control using the HDI sensor 203, even under the usage environment of the user such as recording on the magnetic disk 11 or reproducing the magnetic disk 11, it is feasible to detect a touchdown of the magnetic head 22 and to carry out the flying height control of the magnetic head 22 when the touchdown is detected.

Returning to FIG. 6, the recording and reproduction controller 502 drives the magnetic head 22 by issuing a recording command and a reproduction command to control recording on and reproducing the magnetic disk 11. When the reference power is changed by the flying height controller 501, the recording and reproduction controller 502 carries out the recording or the reproduction again with the flying height of the magnetic head 22 adjusted based on the changed reference power.

Furthermore, while recording on the magnetic disk 11, when a recording error is not occurring but the flag indicative of the occurrence of touchdown is set in the determination register 102, the recording and reproduction controller 502 verifies the recorded data on the magnetic disk 11 by reproducing the recorded data.

Furthermore, while recording on the magnetic disk 11, when a recording error is not occurring and the flag indicative of the occurrence of touchdown is set in the determination register 102 after the reference power is changed already, the recording and reproduction controller 502 also verifies the recorded data on the magnetic disk 11.

Figure 9:
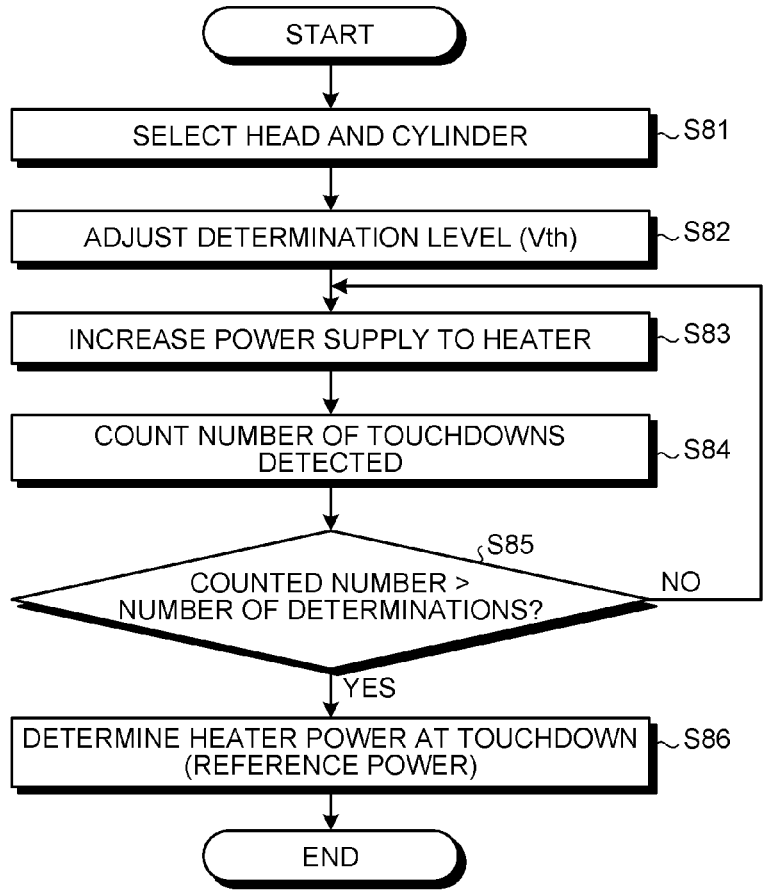
FIG. 9 is an example flowchart illustrating of a measuring process of reference power in the embodiment.

The process of measuring the reference power by the magnetic disk device 1 of the embodiment will be explained below. FIG. 9 is a flowchart of the measurement process of the reference power in the embodiment. The measurement process of the reference power is carried out in adjustment work in the manufacturing process of the magnetic disk device 1 before shipping.

The flying height controller 501 first selects the magnetic head 22 and a cylinder to be measured (S81). The flying height controller 501 then adjusts the determination level that is the threshold value of the touchdown detection (S82).

Figure 10:
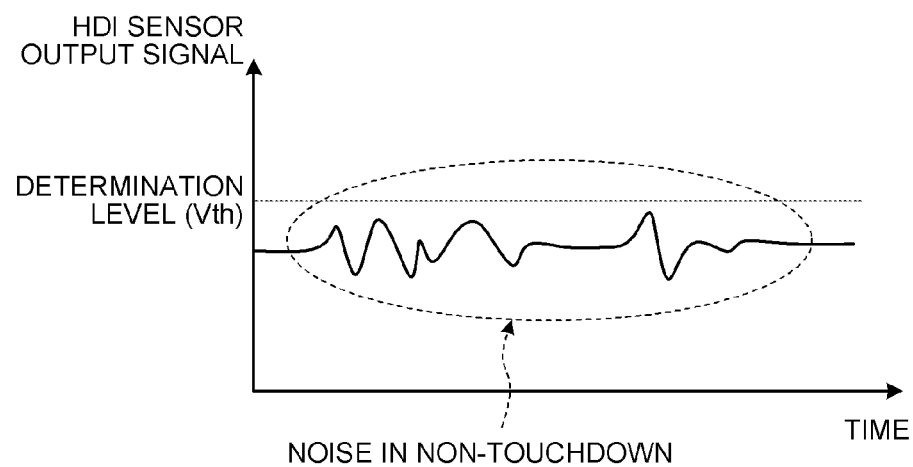
FIG. 10 is an example graph illustrating change in the HDI sensor output signal while no touchdown is occurring in the embodiment.

The adjustment of the determination level will now be explained. FIG. 10 is a graph illustrating change of the HDI sensor output signal while a touchdown is not occurring. In FIG. 10, the vertical axis represents the HDI sensor output signal while a touchdown is not occurring, and the horizontal axis represents the time.

As illustrated in FIG. 10, even when the power supplied to the heater 204 is sufficiently low and a touchdown is not occurring, the level of the HDI sensor output signal fluctuates by minute a change in the resistance of the resistive element 401 in the HDI sensor 203 due to the environmental temperature and by circuit noise of the constant current source. The flying height controller 501 sets the determination level that is the threshold value of the touchdown determination at a value larger than the fluctuating level so that such noise in the HDI sensor output signal is not determined as a touchdown, and stores the determination level in the internal memory of the head amplifier 24.

Referring back to FIG. 9, the flying height controller 501 sends out a command to increase the power supply to the power supplying module 33 so as to increase the power supplied to the heater 204 (S83) The flying height controller 501 then repeats resetting the HDI sensor 203 and reproducing the magnetic disk 11 for a predetermined number of times. In this case, the flying height controller 501 accesses the determination register 102 of the head amplifier 24 each time the resetting and the reproduction are repeated so as to check whether the flag indicative of the occurrence of a touchdown is set and counts the number of touchdowns of the magnetic head 22 detected (S84).

The flying height controller 501 then determines whether the number of touchdowns detected exceeds a predetermined number of determinations (S85). When the number of touchdowns detected does not exceed the predetermined number of determinations (No at S85), the process at S83 and S84 is repeated.

On the other hand, when the number of touchdowns detected exceeds the predetermined number of determinations (Yes at S85), the power supplied to the heater 204 at that time is determined as the heater power at the touchdown, i.e., the reference power (S86) and the determined reference power is stored in the flash ROM 28 or the like.

Figure 11:
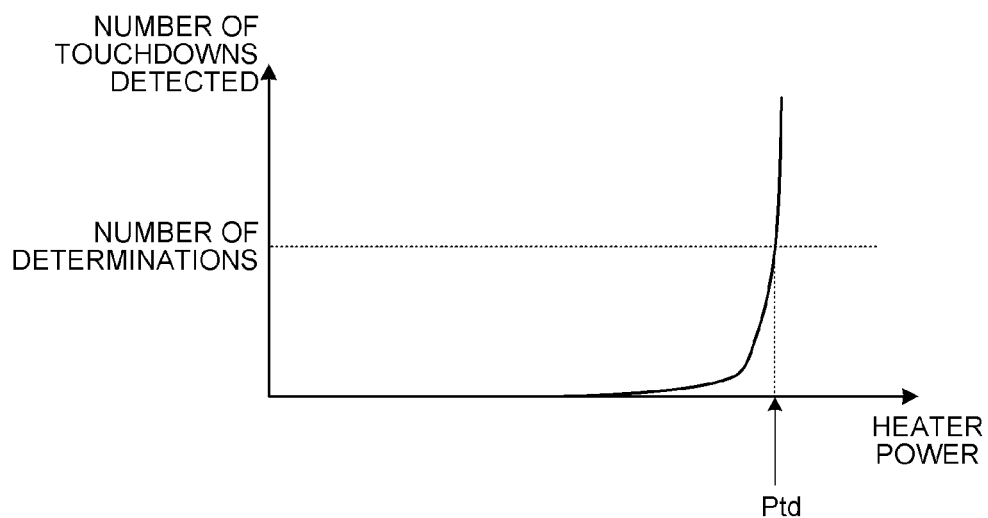
FIG. 11 is an example graph illustrating the relation between electric power supplied to the heater and the number of touchdowns detected in the embodiment.

FIG. 11 is a graph illustrating the relation between the power supplied to the heater and the number of touchdowns detected. In FIG. 11, the vertical axis represents the number of touchdowns detected, and the horizontal axis represents the power supplied to the heater (heater power). As illustrated in FIG. 11, the power supplied at which the number of touchdowns detected exceeds the number of determinations is determined as the reference power (Ptd).

Figure 12:
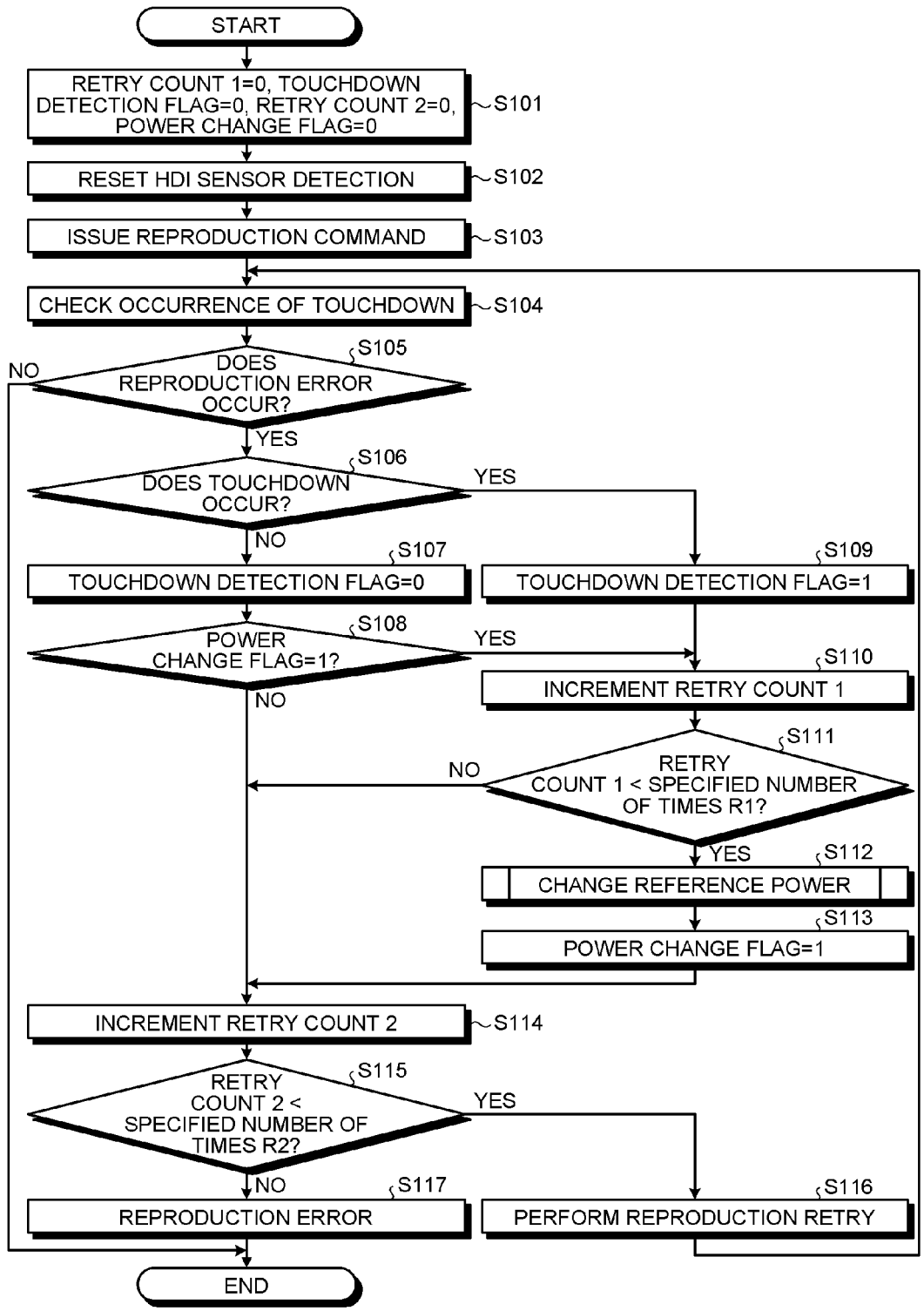
FIG. 12 is an example flowchart of a reproduction process of the magnetic disk in the embodiment.

The process of reproducing the magnetic disk 11 by the magnetic disk device 1 of the embodiment will now be explained. FIG. 12 is a flowchart of the reproduction process of the magnetic disk 11 according to the embodiment. Such a process is carried out while reproducing the magnetic disk 11 under the usage environment of the magnetic disk device 1 by the user.

The flying height controller 501 first initializes a retry count 1, a retry count 2, a touchdown detection flag, and a power change flag (S101). The retry count 1 is a variable used to limit the number of changes of the reference power. The retry count 2 is a variable used to limit the number of reproduction retries. The touchdown detection flag is a flag that is set to ON (1) when the HDI sensor 203 detects a touchdown of the magnetic head 22. The power change flag is a flag that is set to ON (1) when the reference power is changed and is used to determine whether the reference power is changed already.

The flying height controller 501 then resets the detection of the HDI sensor 203 (S102). More specifically, the flying height controller 501 resets the determination register 102 of the head amplifier 24 and sets the determination level in the head amplifier 24 to the value determined at S83 indicated in FIG. 9.

The recording and reproduction controller 502 then issues a reproduction command to carry out the reproduction of the magnetic disk 11 by the reproduction head 202 (S103). The flying height controller 501 refers to the determination register 102 in the head amplifier 24 to check the presence of a touchdown detected (S104).

The recording and reproduction controller 502 then checks whether a reproduction error is occurring (S105). If a reproduction error is not occurring (No at S105), the reproduction process is terminated.

On the other hand, when a reproduction error is occurring (Yes at S105), the flying height controller 501 checks whether a touchdown is occurring from the result of referring to the determination register 102 at S104 (S106).

When a touchdown is occurring (Yes at S106), the flying height controller 501 sets the touchdown detection flag to ON (1) (S109) and increments the retry count 1 (increased by one) (S110).

The flying height controller 501 then determines whether the retry count 1 is below a predetermined specified number of times R1 (S111) When the retry count 1 is below the specified number of times R1 (Yes at S111), the flying height controller 501 carries out the changing process of the reference power (Ptd) (S112). In this case, the changing process of the reference power is carried out to reduce the reference power. The detail of the changing process of the reference power (Ptd) will be described later. The flying height controller 501 then sets the power change flag to ON (1) (S113).

At S111, when the retry count 1 is equal to or greater than the specified number of times R1 (No at S111), the process at S112 and S113 is not carried out and the reference power is not changed.

Next, the flying height controller 501 increments the retry count 2 (S114) and determines whether the retry count 2 is below a predetermined specified number of times R2 (S115) When the retry count 2 is below the specified number of times R2 (Yes at S115), the recording and reproduction controller 502 carries out a reproduction retry of the magnetic disk 11, i.e., carries out the reproduction again (S116) and the process at and after S104 is carried out again.

On the other hand, at S115, when the retry count 2 is equal to or greater than the specified number of times R2 (No at S115), the recording and reproduction controller 502 carries out the process as a reproduction error (S117) and the reproduction process is terminated.

Returning to S106, when the reproduction error is occurring but a touchdown is not detected (No at S106), the flying height controller 501 sets the touchdown detection flag to OFF (0) (S107) and determines whether the reference power is changed already by checking whether the power change flag is ON (1) (S108). When the power change flag is ON (1) (Yes at S108), the flying height controller 501 determines that the reference power is changed already. By moving on to S110, the changing process of the reference power is carried out. In this case, because the flying height of the magnetic head 22 may be too large, the reference power is increased.

Meanwhile, at S108, when the power change flag is OFF (0) (No at S108), by moving on to S114, the reference power is not changed.

Consequently, in reproducing the magnetic disk 11 that is a usage environment of the user, by constantly detecting he touchdown of the magnetic head 22 using the HDI sensor 203 and carrying out the reproduction retry, reproduction errors can be reduced.

Figure 13:
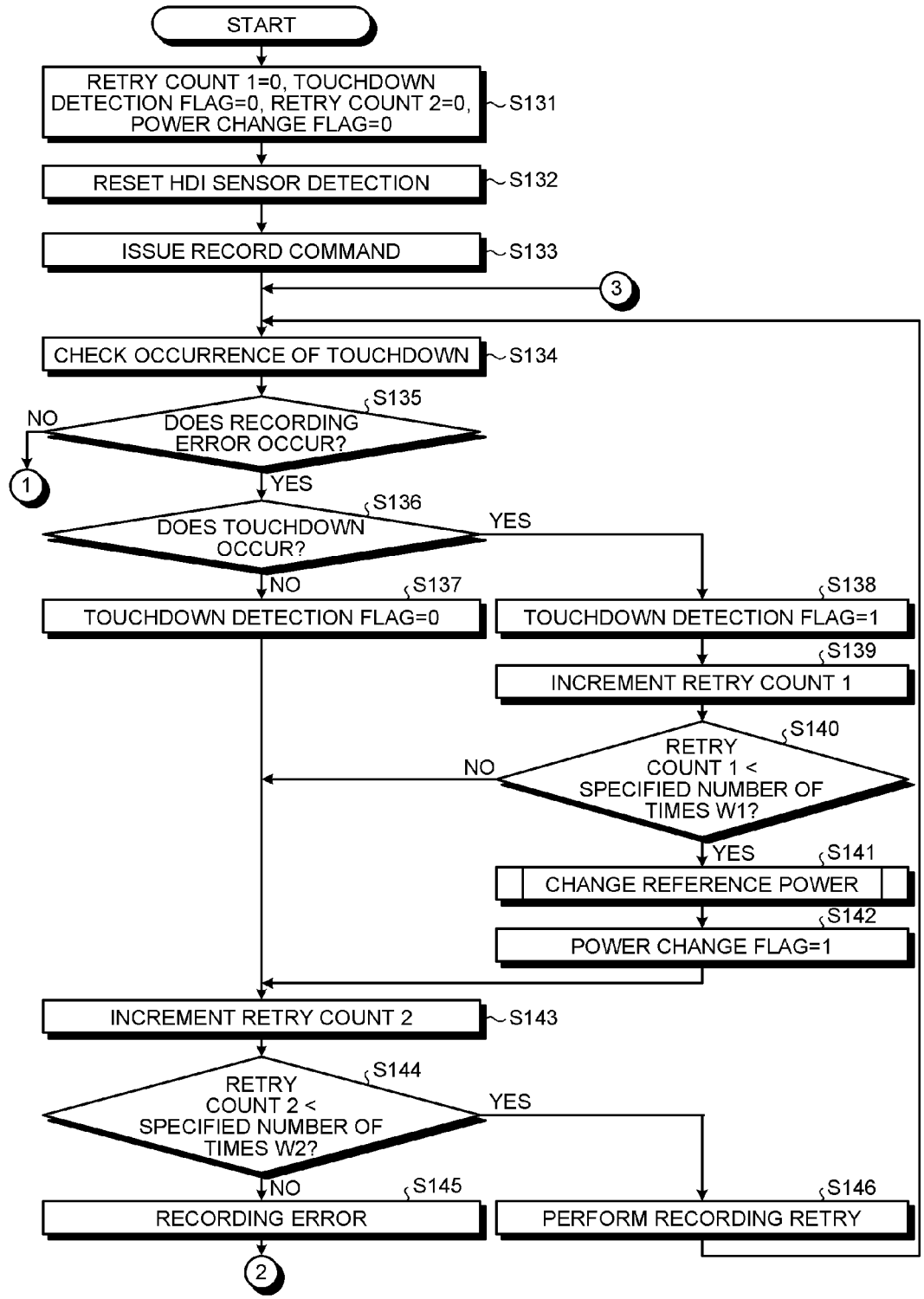
FIG. 13 is an example flowchart of a recording process of the magnetic disk in the embodiment.
Figure 14:
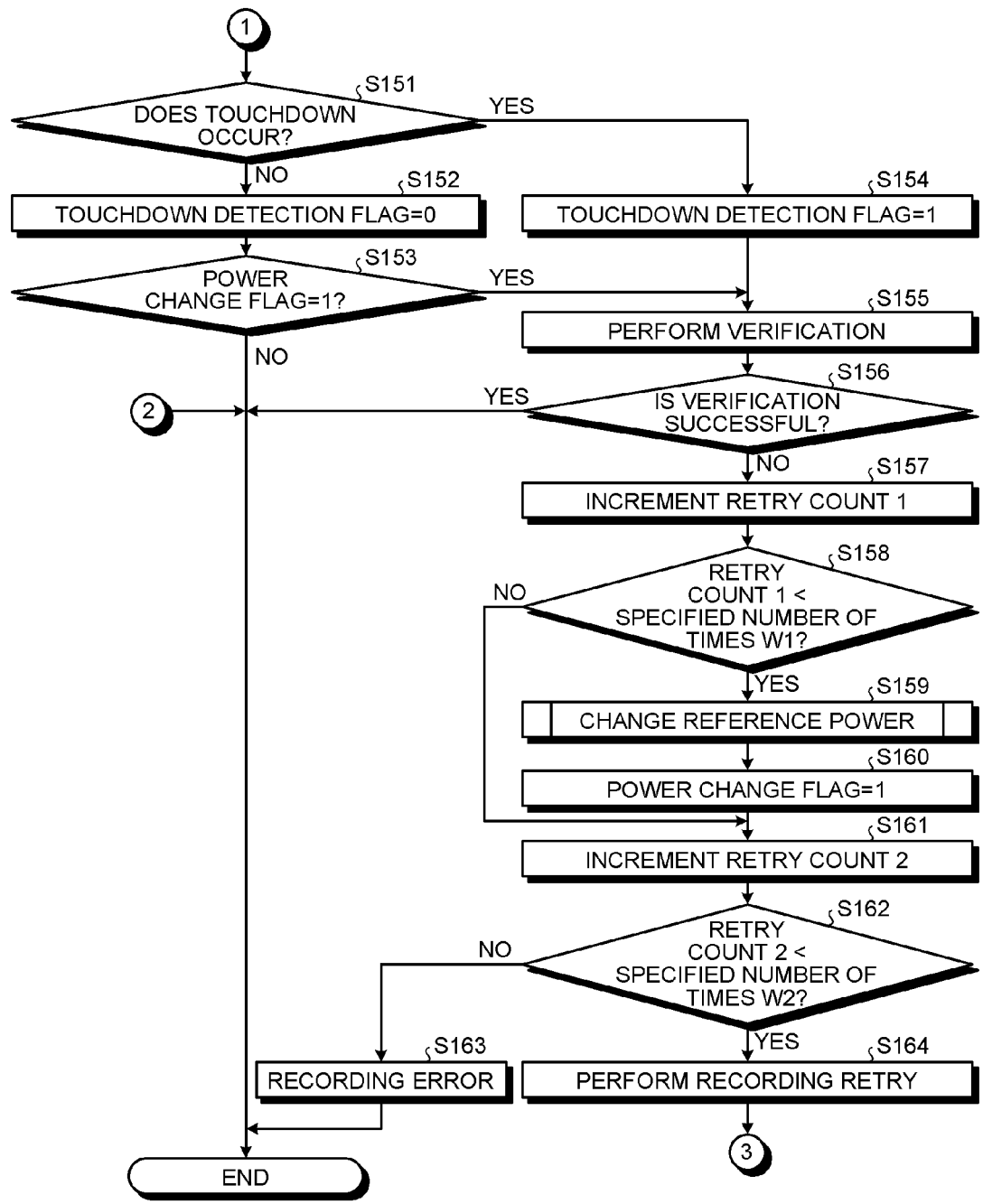
FIG. 14 is an example flowchart of the recording process of the magnetic disk in the embodiment.

The process of recording on the magnetic disk 11 by the magnetic disk device 1 of the embodiment will now be explained. FIGS. 13 and 14 are flowcharts of the recording process of the magnetic disk 11 according to the embodiment. Such a process is carried out while recording on the magnetic disk 11 under the usage environment of the magnetic disk device 1 by the user.

The flying height controller 501 first initializes a retry count 1, a retry count 2, a touchdown detection flag, and a power change flag (S131). The retry count 1, the touchdown detection flag, and the power change flag are a variable and flags, respectively, which are similar to those in the reproduction process explained with reference to 12. The retry count 2 is a variable used to limit the number of recording retries.

The flying height controller 501 then resets the detection of the HDI sensor 203 (S132). More specifically, similarly to the reproduction process, resetting the determination register 102 and setting the determination level are carried out.

Subsequently, the recording and reproduction controller 502 issues a recording command to carry out recording on the magnetic disk 11 by the recording head 201 (S133). The flying height controller 501 refers to the determination register 102 of the head amplifier 24 to check the presence of a touchdown detected (S134).

The recording and reproduction controller 502 then checks whether a recording error is occurring (S135). When a recording error is occurring (Yes at S135), the flying height controller 501 checks whether a touchdown is occurring from the result of referring to the determination register 102 at S134 (S136). When a touchdown is occurring (Yes at S136), the flying height controller 501 sets the touchdown detection flag to ON (1) (S138) and increments the retry count 1 (increased by one) (S139).

The flying height controller 501 then determines whether the retry count 1 is below a predetermined specified number of times W1 (S140). When the retry count 1 is below the specified number of times W1 (Yes at S140), the flying height controller 501 carries out the changing process of the reference power (Ptd) (S141). The flying height controller 501 then sets the power change flag to ON (1) (S142) In this case, the changing process of the reference power is carried out to reduce the reference power.

At S140, when the retry count 1 is equal to or greater than the specified number of times W1 (No at S140), the process at S141 and S142 is not carried out and the reference power is not changed.

Subsequently, the flying height controller 501 increments the retry count 2 (S143) and determines whether the retry count 2 is below a predetermined specified number of times W2 (S144). When the retry count 2 is below the specified number of times W2 (Yes at S144), the recording and reproduction controller 502 carries out a recording retry of the magnetic disk 11, i.e., carries out the recording again (S146) and the process at and after S134 is carried out again.

In contrast, at S144, when the retry count 2 is equal to or greater than the specified number of times W2 (No at S144), the recording and reproduction controller 502 carries out the process as a recording error (S145) and the recording process is terminated.

Returning to S135, when the recording error is occurring but a touchdown is not detected (No at S136), the flying height controller 501 sets the touchdown detection flag to OFF (0) (S137) and the process is moved on to S143. Accordingly, when the recording error is occurring but a touchdown is not detected, either the processing as a recording error (No at S144, S145) or the recording retry (S146) is carried out without carrying out the changing process of the reference power.

Returning to S135, when a recording error is not occurring (No at S135), the flying height controller 501 checks whether a touchdown is occurring from the result of referring to the determination register 102 at S134 (S151). When a touchdown is detected (Yes at S151), the flying height controller 501 sets the touchdown detection flag to ON (1) (S154).

As just described, when the touchdown is detected even though the recording is made successfully without recording errors, although no recording error is occurring with respect to positioning accuracy, the recording characteristics may deteriorate due to the flying height of the magnetic head 22 being too large. Therefore, the recording and reproduction controller 502 reproduces the data recorded on the magnetic disk 11 (recording data) in the recording process to verify the recorded data (S155).

When the verification is successful, i.e., the recording data matches the reproduction data (Yes at S156), it is determined that there is no problem with the recording characteristics, and the recording process is terminated.

On the other hand, when the verification fails, i.e., the recording data does not match the reproduction data (No at S156), the flying height controller 501 increments the retry count 1 (S157) and determines whether the retry count 1 is below the specified number of times W1 (S158).

When the retry count 1 is below the specified number of times W1 (Yes at S158), the flying height controller 501 carries out the changing process of the reference power (Ptd) (S159). The flying height controller 501 then sets the power change flag to ON (1) (S160). In this case, the changing process of the reference power is to reduce the reference power.

At S158, when the retry count 1 is equal to or grater than the specified number of times W1 (No at S158), the process at S159 and S160 is not carried out and the reference power is not changed.

Next, the flying height controller 501 then increments the retry count 2 (S161) and determines whether the retry count 2 is below a specified number of times W2 (S162). When the retry count 2 is below the specified number of times W2 (Yes at S162), the recording and reproduction controller 502 carries out the recording retry of the magnetic disk 11 (S164) and the process at and after S134 is carried out again.

Meanwhile, at S162, when the retry count 2 is equal to or greater than the specified number of times W2 (No at S162), the recording and reproduction controller 502 carries out the process as a recording error (S163) and the recording process is terminated.

Returning to S151, when a touchdown is not detected (No at S151), the flying height controller 501 sets the touchdown detection flag to OFF (0) (S152) and determines whether the reference power is changed already by checking whether the power change flag is ON (1) (S153). When the power change flag is OFF (0) (No at S153), the recording process is terminated.

In contrast, when the power change flag is ON (1) (Yes at S153), the flying height controller 501 determines that the reference power is changed already. By moving on to S155, the recording and reproduction controller 502 verifies the data recorded on the magnetic disk 11 (S155). Thereafter, based on the result of the verification, changing of the reference power, a recording retry, or the like are carried out (S156 to S164).

As a consequence, in recording on the magnetic disk 11 that is a usage environment of the user, by constantly detecting the touchdown of the magnetic head 22 using the HDI sensor 203 and carrying out the recording retry, recording errors can be reduced.

Figure 15:
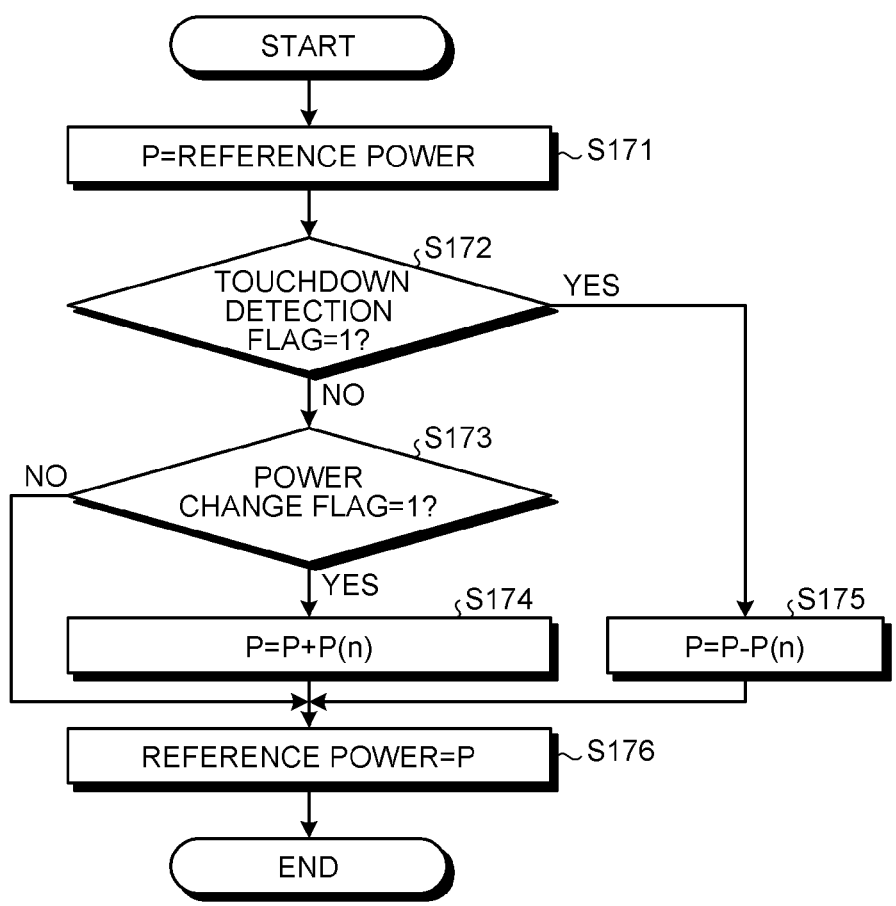
FIG. 15 is an example flowchart of a changing process of the reference power in the embodiment.

The detail of the changing process of the reference power performed at S112, S141, and S159 will now be explained. FIG. 15 is a flowchart of the changing process of the reference power according to the embodiment. In FIG. 15, a symbol n represents the number of retries.

The flying height controller 501 first sets the last reference power to a setting value P (S171). The flying height controller 501 then checks whether the touchdown detection flag is ON (1) (S172). When the touchdown detection flag is ON (1) (Yes at S172), a touchdown to the magnetic disk 11 is occurring because of the flying height of the magnetic head 22 being too low. Therefore, the setting value P is reduced by the amount P(n) (S175) and then the changed setting value P is set as the reference power (Ptd) (S176).

Accordingly, the flying height controller 501 heats the heater 204 by supplying the power (Popt) corresponding to the target flying height that is the result of subtracting the adjustment power (Pbo) from the reduced reference power (Ptd), thereby controlling the flying height of the magnetic head 22 to be increased.

At S172, when the touchdown detection flag is OFF (0) (No at S172), the flying height controller 501 checks whether the reference power (Ptd) is reduced already (S173) by checking whether the power change flag is ON (1) When the power change flag is ON (1) (Yes at S173), because the reference power (Ptd) is reduced already and the flying height of the magnetic head 22 is set large, the setting value P is increased by the amount P(n) (S174) and the changed setting value P is set as the reference power (Ptd) (S176).

Accordingly, the flying height controller 501 heats up the heater 204 by supplying the power (Popt) corresponding to the target flying height that is the result of subtracting the adjustment power (Pbo) from the increased reference power (Ptd), thereby controlling the flying height of the magnetic head 22 to be lowered.

At S173, when the power change flag is OFF (0) (No at S173), the flying height controller 501 sets the setting value P as the reference power (Ptd) without changing the setting value P (S176). Therefore, when the touchdown is not detected and the reference power (Ptd) is not changed yet, the changing of the reference power (Ptd) is not carried out.

FIG. 16 is a diagram for explaining an example of changing the reference power. In the example illustrated in FIG. 16, examples of the touchdown detection flag, the power change flag, the reference power (Ptd), and the reproduction result at the retry count 1 of zero to three times are illustrated.

A symbol Ptn represents an initial reference power. As for changing values of the reference power, numerical values of Pr(1) to Pr(3) are prepared in advance, where Pr(1) to Pr(3) are defined as Pr(1)>Pr(2)>Pr(3).

When a reproduction error occurs and a touchdown of the magnetic head 22 occurs in the first reproduction (retry count 1=0), the resultant value of the reference power Ptn at the time when the reproduction error occurred subtracted by Pr(1) is set as the reference power for the subsequent reproduction retry (retry count 1=1).

When a reproduction error occurs and a touchdown occurs in the reproduction retry (retry count 1=1), the resultant value of the reference power at the time of the reproduction retry Ptn-Pr(1) subtracted by Pr(2) is set as the reference power for the subsequent reproduction retry (retry count 1=2).

Figure 17:
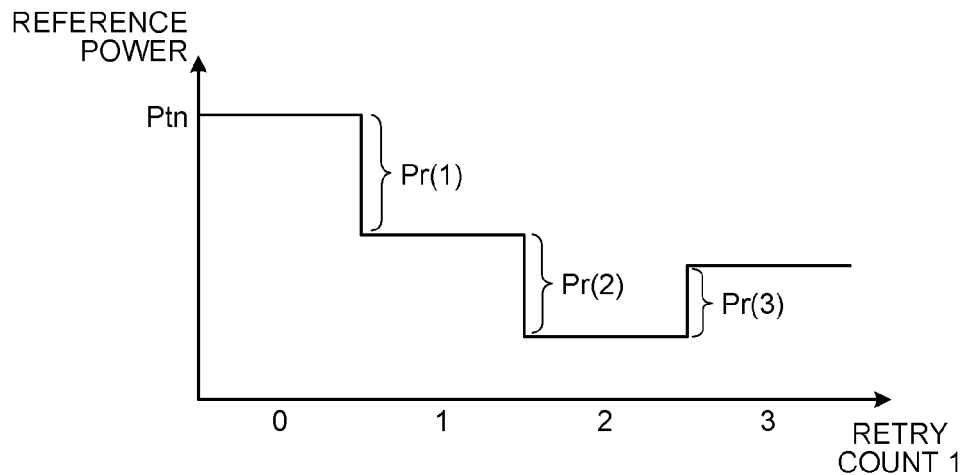
FIG. 17 is an example graph illustrating the changes of the reference power illustrated in FIG. 16.

When a reproduction error occurs but no touchdown is occurring (touchdown detection flag=0) in the reproduction retry (retry count 1=2), because the reference power is reduced already in the previous time (power change flag=1), the resultant value of the reference power Ptn-Pr(1)-Pr(2) added by Pr(3) is set as the reference power for the subsequent reproduction retry (retry count 1=3). FIG. 17 is a graph illustrating the changes of the reference power in the example illustrated in FIG. 16. In FIG. 17, the horizontal axis represents the retry count 1, and the vertical axis represents the reference power.

In the magnetic disk device 1 according to the embodiment, the magnetic head 22 is brought into contact with the magnetic disk 11 and this touchdown is detected by the HDI sensor 203 to measure the reference power that is the power supplied to the heater 204 at the time of the touchdown. This makes it possible to measure the reference power accurately without being affected by positioning accuracy and to measure the reference power even near the inner circumference of the magnetic disk 11.

In the detection of the touchdown by the HDI sensor 203 of the embodiment, because it is not necessary to read data from the magnetic disk 11, the detection of the touchdown can be carried out regardless of the recording density of the magnetic disk 11.

In the magnetic disk device 1 of the embodiment, while recording on or reproducing the magnetic disk 11, the occurrence of touchdowns is constantly detected using the HDI sensor 203 and, when a touchdown is detected, the recording retry or the reproduction retry is carried out by changing the reference power. This makes it possible to reduce the occurrence of recording errors or reproduction errors, respectively.

The magnetic disk control program executed by the CPU 26 of the magnetic disk device 1 according to the embodiment is provided in the flash ROM 28.

The magnetic disk control program executed by the CPU 26 of the magnetic disk device 1 according to the embodiment may be provided as a file in an installable or executable format in a computer readable recording medium such as a compact disk-read only memory CD-ROM, a flexible disk (FD), a compact disk-recordable CD-R, and a digital versatile disk (DVD).

Furthermore, the magnetic disk control program executed by the CPU 26 of the magnetic disk device 1 according to the embodiment may be stored in a computer connected to a network such as the Internet and provided by being downloaded via the network. In addition, the magnetic disk control program executed by the CPU 26 of the magnetic disk device 1 according to the embodiment may be provided or distributed via a network such as the Internet.

The magnetic disk control program executed by the CPU 26 of the magnetic disk device 1 according to the embodiment has a modular structure comprising the modules (the flying height controller 501 and the recording and reproduction controller 502) The CPU 26 as actual hardware reads and executes the magnetic disk control program from the flash ROM 20, so that the modules are loaded on a main storage device. Accordingly, the flying height controller 501 and the recording and reproduction controller 502 are provided on the main storage device.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and a change in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording and reproduction device, comprising:
   a magnetic recording medium;
   a head configured to record and reproduce data on the magnetic recording medium;
   a heater configured to heat the head in response to electric power;
   a detector comprising a resistive element, wherein the detector is configured to detect a contact between the head and the magnetic recording medium by detecting a change in resistance of the resistive element, wherein the change in resistance is associated with the contact between the head and the magnetic recording medium;
   a flying height controller configured to control a flying height of the head from the magnetic recording medium by supplying electric power to the heater based on a reference power value, the flying height controller further configured to determine the reference power value by:

supplying electric power to the heater, wherein the electric power causes the head to thermally deform and contact the magnetic recording medium; and determining an amount of the electric power supplied when the head contacts the magnetic recording medium, wherein the reference power value is based on the amount of the electric power; and a recording and reproduction controller configured to control recording and reproducing of the data on the magnetic recording medium by driving the head, wherein the flying height controller is further configured to modify the flying height by changing the reference power value in response to a reproduction error occurring when the magnetic recording medium is reproduced, and further in response to the detector detecting the contact between the head and the magnetic recording medium; and wherein the recording and reproduction controller is further configured to reproduce the data recorded on the magnetic recording medium again using the modified flying height, wherein the flying height controller is further configured to modify the flying height by changing the reference power value in response to a recording error occurring when the magnetic recording medium is reproduced, and further in response to the detector detecting the contact between the head and the magnetic recording medium, wherein the recording and reproduction controller is further configured to record the data on the magnetic recording medium again using the modified flying height, wherein in response to the detector detecting the contact between the head and the magnetic recording medium without a recording error occurring, the recording and reproduction controller is further configured to verify recorded data on the magnetic recording medium by reproducing the recorded data, and wherein in response to a reproduction error occurring when verifying the recorded data:
the flying height controller is further configured to modify the flying height by changing the reference power value, and
the recording and reproduction controller is further configured to record the data on the magnetic recording medium again using the modified flying height.

2. The magnetic recording and reproduction device of claim 1,
wherein, when the data is recorded without the occurrence of a recording error and without the detector detecting the contact between the head and the magnetic recording medium, and even when the reference power value has been already changed, the recording and reproduction controller is further configured to verify recorded data on the magnetic recording medium by reproducing the recorded data.

3. The magnetic recording and reproduction device of claim 1, wherein the flying height controller is further configured to reduce the reference power value if the detector detects the contact between the head and the magnetic recording medium.

4. The magnetic recording and reproduction device of claim 3, wherein the flying height controller is further configured to increase the reference power value if the detector does not detect the contact between the head and the magnetic recording medium and the flying height controller has previously reduced the reference power value.

5. A flying height control method performed in a magnetic recording and reproduction device that comprises a magnetic recording medium, a head configured to record and reproduce data on the magnetic recording medium, and a heater configured to heat the head in response to electric power, the flying height control method comprising:
detecting a contact between the head and the magnetic recording medium by detecting a change in resistance of a resistive element associated with the contact between the head and the magnetic recording medium;
determining a reference power value based on an amount of electric power supplied to the heater when the head is in contact with the magnetic recording medium, wherein the electric power causes the head to thermally deform and contact the magnetic recording medium;
controlling a flying height of the head from the magnetic recording medium by supplying electric power to the heater based on the reference power value;
controlling recording and reproducing of the data on the magnetic recording medium by driving the head;
modifying the flying height by changing the reference power value in response to a reproduction error occurring when the magnetic recording medium is reproduced, and further in response to detecting the contact between the head and the magnetic recording medium;
reproducing the data recorded on the magnetic recording medium again using the modified flying height;
modifying the flying height by changing the reference power value in response to a recording error occurring when the magnetic recording medium is reproduced, and further in response to detecting the contact between the head and the magnetic recording medium;
recording the data on the magnetic recording medium again using the modified flying height;
verifying recorded data on the magnetic recording medium by reproducing the recorded data in response to detecting the contact between the head and the magnetic recording medium without a recording error occurring; and
in response to a reproduction error occurring when verifying the recorded data:
modifying the flying height by changing the reference power value; and
recording the data on the magnetic recording medium again using the modified flying height.

6. The flying height control method of claim 5, further comprising:
verifying recorded data on the magnetic recording medium by reproducing the recorded data in response to the data being recorded without the occurrence of a recording error and without detecting the contact between the head and the magnetic recording medium, and even when the reference power value has been already changed.

7. The flying height control method of claim 5, further comprising reducing the reference power value in response to detecting contact between the head and the magnetic recording medium.

8. The flying height control method of claim 7, further comprising increasing the reference power value in response to not detecting contact between the head and the magnetic recording medium when the reference power value has been reduced.

* * * * *